United States Patent
Rothermel et al.

(10) Patent No.: US 8,867,167 B2
(45) Date of Patent: Oct. 21, 2014

(54) TAPERED POLE HEADS FOR MAGNETIC MEDIA

(71) Applicant: Imation Corp., Oakdale, MN (US)

(72) Inventors: Stephen J. Rothermel, Roseville, MN (US); Douglas W. Johnson, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 13/795,482

(22) Filed: Mar. 12, 2013

(65) Prior Publication Data

US 2013/0286504 A1   Oct. 31, 2013

Related U.S. Application Data

(60) Provisional application No. 61/638,820, filed on Apr. 26, 2012.

(51) Int. Cl.
*G11B 5/187* (2006.01)
*G11B 5/29* (2006.01)
*G11B 5/008* (2006.01)
*G11B 5/127* (2006.01)

(52) U.S. Cl.
CPC ............ *G11B 5/1272* (2013.01); *G11B 5/1871* (2013.01); *G11B 5/00813* (2013.01)
USPC .............................. 360/121; 360/90; 360/122

(58) Field of Classification Search
CPC ............................. G11B 5/00826; G11B 5/29
USPC ............................................ 360/90, 121, 122
See application file for complete search history.

(56) References Cited

U.S. PATENT DOCUMENTS

| | | | |
|---|---|---|---|
| 4,493,779 A | 1/1985 | Kamiyama |
| 4,493,874 A | 1/1985 | Kubo et al. |
| 4,672,009 A | 6/1987 | Takahashi |
| 4,690,768 A | 9/1987 | Kamiyama |
| 4,975,791 A | 12/1990 | Eggebeen |

(Continued)

FOREIGN PATENT DOCUMENTS

| | | |
|---|---|---|
| GB | 812 023 A | 4/1959 |
| JP | 1208712 A | 8/1989 |
| JP | 2009-020943 A | 1/2009 |
| SU | 1631598 A1 | 2/1991 |

OTHER PUBLICATIONS

Kryder, Mark H. "An Introduction to Magnetic Recording Heads," in: Hadjipanayis, George C., ed., *Magnetic Storage Systems Beyond 2000*, NATO Science Series, vol. 41, Netherlands, Kluwer Academic Publishers, 2001, pp. 449-466.

(Continued)

*Primary Examiner* — Jefferson Evans
(74) *Attorney, Agent, or Firm* — Dorsey & Whitney LLP

(57) ABSTRACT

A system comprises a first tapered core configured for positioning adjacent a first surface of a magnetic medium, and a second tapered core configured for positioning adjacent a second surface of the magnetic medium, opposite the first tapered core along a travel direction of the magnetic medium. Each of the first and second tapered cores has a transverse width defined with respect to the magnetic medium, where the transverse width decreases from a first end of the tapered core to a second end of the tapered core, the second end forming a pole face adjacent the magnetic medium.

29 Claims, 7 Drawing Sheets

(56) References Cited

U.S. PATENT DOCUMENTS

| | | | |
|---|---|---|---|
| 5,132,860 A | 7/1992 | Von Stein |
| 5,247,397 A | 9/1993 | Sato et al. |
| 5,293,285 A | 3/1994 | Leonhardt et al. |
| 5,572,392 A | 11/1996 | Aboaf et al. |
| 5,689,384 A | 11/1997 | Albrecht et al. |
| 6,021,013 A | 2/2000 | Albrecht et al. |
| 6,040,964 A | 3/2000 | Saliba |
| 6,282,051 B1 | 8/2001 | Albrecht et al. |
| 6,462,904 B1 | 10/2002 | Albrecht et al. |
| 6,542,325 B1 | 4/2003 | Molstad et al. |
| 6,647,613 B2 | 11/2003 | Beck et al. |
| 6,781,778 B1 | 8/2004 | Molstad et al. |
| 6,807,025 B1 | 10/2004 | Benakli et al. |
| 6,822,827 B1 | 11/2004 | Heinz et al. |
| 6,824,817 B2 | 11/2004 | Araki et al. |
| 6,842,305 B2 | 1/2005 | Molstad et al. |
| 6,943,987 B1 | 9/2005 | Raymond et al. |
| 6,950,269 B1 | 9/2005 | Johnson |
| 6,972,931 B2 * | 12/2005 | Rudi et al. ..................... 360/241 |
| 7,002,763 B2 | 2/2006 | Bui et al. |
| 7,012,774 B2 | 3/2006 | Nakao et al. |
| 7,038,873 B2 | 5/2006 | Shimazaki et al. |
| 7,050,251 B2 | 5/2006 | Lundstrom |
| 7,054,101 B1 | 5/2006 | Marion et al. |
| 7,072,133 B1 | 7/2006 | Yip et al. |
| 7,132,164 B2 | 11/2006 | Yamazaki et al. |
| 7,180,699 B1 * | 2/2007 | Dee ................................ 360/90 |
| 7,190,551 B2 | 3/2007 | Suda |
| 7,193,812 B2 | 3/2007 | Eaton |
| 7,206,167 B2 | 4/2007 | Beck et al. |
| 7,224,544 B2 | 5/2007 | Takano et al. |
| 7,381,482 B2 | 6/2008 | Yamazaki et al. |
| 7,436,622 B2 | 10/2008 | Johnson et al. |
| 7,515,374 B2 | 4/2009 | Nakao |
| 7,551,380 B2 | 6/2009 | Watson et al. |
| 7,623,310 B2 | 11/2009 | Nakao |
| 7,736,769 B2 | 6/2010 | Ajan |
| 7,864,487 B2 | 1/2011 | Cherubini et al. |
| 7,986,485 B2 | 7/2011 | Mckinstry et al. |
| 8,014,100 B2 | 9/2011 | Biskeborn et al. |
| 8,228,637 B2 | 7/2012 | Schaefer et al. |
| 8,254,052 B2 | 8/2012 | Dugas |
| 8,310,780 B2 | 11/2012 | Imaino et al. |
| 8,670,203 B2 | 3/2014 | Ohtsu et al. |
| 2003/0017364 A1 | 1/2003 | Kikitsu et al. |
| 2003/0095353 A1 | 5/2003 | Nakao |
| 2003/0099059 A1 | 5/2003 | Nakao |
| 2004/0080847 A1 | 4/2004 | Lundstrom |
| 2005/0099718 A1 | 5/2005 | Takano et al. |
| 2005/0122620 A1 | 6/2005 | Suda |
| 2005/0254170 A1 | 11/2005 | Dugas et al. |
| 2006/0126207 A1 | 6/2006 | Johnson et al. |
| 2006/0177702 A1 | 8/2006 | Ajan |
| 2007/0223126 A1 | 9/2007 | Olson et al. |
| 2007/0230040 A1 | 10/2007 | Dugas et al. |
| 2007/0231609 A1 | 10/2007 | Ajan et al. |
| 2008/0024905 A1 | 1/2008 | Johnson et al. |
| 2008/0030899 A1 * | 2/2008 | Norton .......................... 360/134 |
| 2008/0049356 A1 | 2/2008 | Weber et al. |
| 2008/0158721 A1 | 7/2008 | Bui et al. |
| 2008/0304180 A1 | 12/2008 | Schaefer et al. |
| 2009/0040643 A1 | 2/2009 | Weng et al. |
| 2009/0046396 A1 | 2/2009 | Nagata et al. |
| 2009/0080108 A1 | 3/2009 | Watson et al. |
| 2009/0141393 A1 * | 6/2009 | Vanderheyden et al. ........ 360/93 |
| 2010/0002335 A1 | 1/2010 | Dugas |
| 2010/0246057 A1 | 9/2010 | Mckinstry et al. |
| 2011/0102116 A1 * | 5/2011 | Biskeborn et al. ............. 335/302 |
| 2011/0102936 A1 | 5/2011 | Sugiyama et al. |
| 2011/0141604 A1 | 6/2011 | Dugas et al. |
| 2011/0222187 A1 | 9/2011 | Biskeborn |
| 2012/0019954 A1 | 1/2012 | Imaino et al. |
| 2012/0050908 A1 | 3/2012 | Ohtsu et al. |
| 2012/0050910 A1 | 3/2012 | Ohtsu et al. |
| 2012/0194941 A1 | 8/2012 | Jubert |
| 2012/0314318 A1 | 12/2012 | Olson et al. |
| 2012/0314319 A1 | 12/2012 | Olson et al. |
| 2012/0314320 A1 | 12/2012 | Olson et al. |
| 2012/0314322 A1 | 12/2012 | Olson et al. |
| 2013/0148235 A1 * | 6/2013 | Ochi et al. ...................... 360/75 |
| 2013/0286504 A1 | 10/2013 | Rothermel et al. |

OTHER PUBLICATIONS

Cherubini, Giovanni, et al. "29.5-Gb/in$^2$ Recording Areal Density on Barium Ferrite Tape," *IEEE Transactions on Magnetics*, vol. 47, No. 1, pp. 137-147, Jan. 2011.

International Search Report dated Apr. 25, 2013, for PCT Application No. PCT/US2013/023816 filed Jan. 30, 2013.

International Search Report dated Aug. 13, 2012, for PCT Application No. PCT/US2012/042094 filed Jun. 12, 2012.

U.S. Appl. No. 13/795,668, filed Mar. 12, 2013, entitled "Methods and Systems for Magnetic Media Servo Writing".

U.S. Appl. No. 13/795,421, filed Mar. 12, 2013, entitled "Systems and Methods for Processing Magnetic Media".

U.S. Appl. No. 13/795,590, filed Mar. 12, 2013, entitled "Servo Write Head".

U.S. Appl. No. 13/754,078, filed Jan. 30, 2013, entitled "Perpendicular Pole Head for Servo Writing Magnetic Media".

* cited by examiner

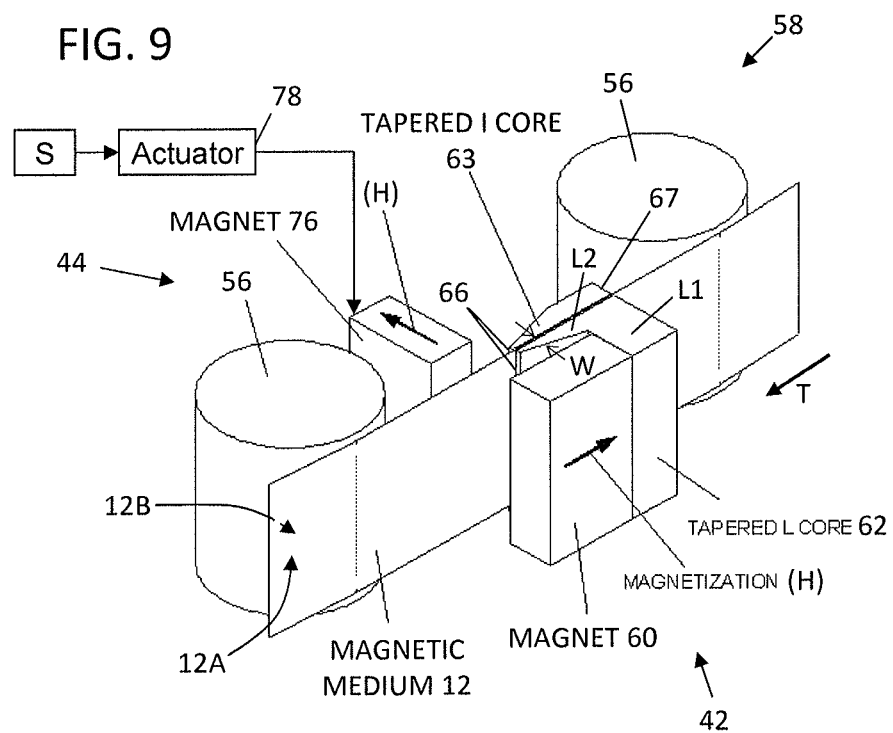
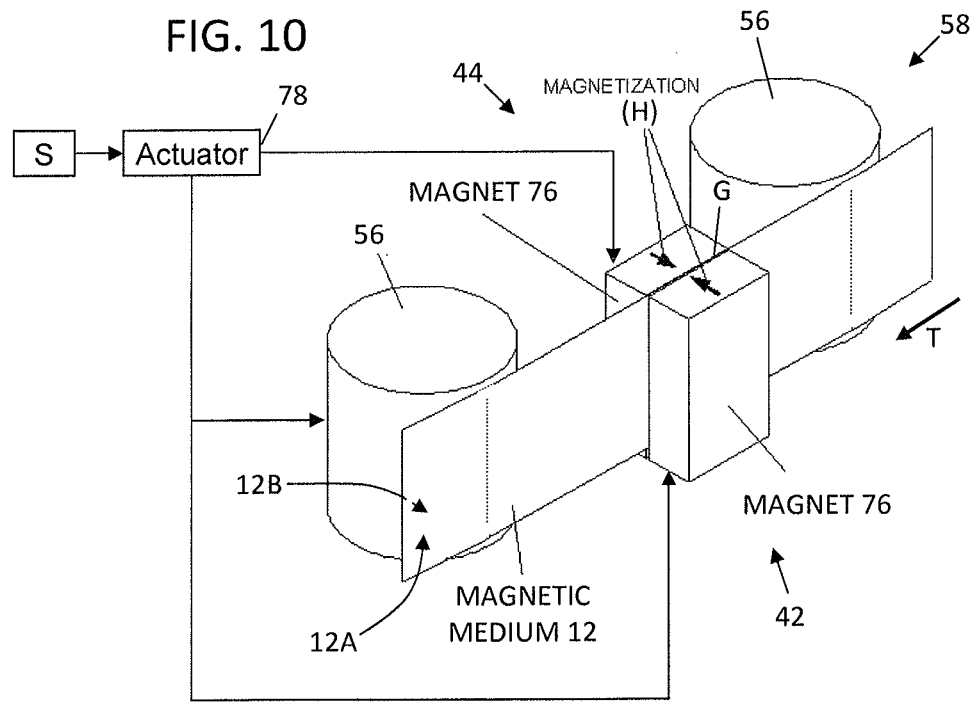

TAPERED POLE HEADS FOR MAGNETIC MEDIA

RELATED U.S. APPLICATION DATA

This application claims priority to U.S. provisional Application No. 61/638,820, filed Apr. 26, 2012, and incorporated herein by reference.

The subject matter of this application is also related to that of the following applications, each of which is incorporated by reference in its entirety for all purposes: U.S. non-provisional application Ser. No. 13/795,421, entitled "METHODS AND SYSTEMS FOR PROCESSING MAGNETIC MEDIA", filed on even date herewith, which claims priority to U.S. provisional Application No. 61/638,832, filed Apr. 26, 2012; U.S. non-provisional application Ser. No. 13/795,668, entitled "METHODS AND SYSTEMS FOR MAGNETIC MEDIA SERVO WRITING", filed on even date herewith, which claims priority to U.S. provisional Application No. 61/638,767, filed Apr. 26, 2012; U.S. non-provisional application Ser. No. 13/795,590, entitled "SERVO WRITE HEAD", filed on even date herewith, which claims priority to U.S. provisional Application No. 61/638,806, filed Apr. 26, 2012; and U.S. non-provisional application Ser. No. 13/754,078, entitled "PERPENDICULAR POLE HEAD FOR SERVO WRITING MAGNETIC MEDIA", filed Jan. 30, 2013, which claims priority to U.S. provisional Application No. 61/620,199, filed Apr. 4, 2012.

BACKGROUND

Magnetic tape-based data storage systems provide secure, reliable, cost-efficient, and scalable data storage solutions for business, industry, and government service applications. Cartridge-based magnetic tape systems combine efficiency and ease of use in regulated bulk storage environments, and are adaptable for use with online, nearline, offline, and offsite infrastructures to relay large datasets, ensure regulatory compliance, and safeguard critical information, while lowering data storage costs and service time.

Magnetic tape systems provide high data storage densities and capacity, with adaptable performance criteria suitable for a wide range of backup, archiving, and portable data storage needs. As storage densities and access speeds increase, however, substantial engineering demands are made on the servo system, which must provide precise head positioning capability in order to quickly, accurately, and reliably read and write data to and from the data storage medium.

The storage medium itself is typically divided into alternating data storage and servo bands. Servo patterns are recorded onto the servo bands during the formatting or manufacturing process, and used to position the data heads during read and write operations. The servo control system uses servo heads to read the servo patterns, and performs a time-based pattern conversion to determine position. Based on the servo signal, the data heads can be precisely positioned along particular data tracks, as defined between adjacent servo bands.

Representative servo pattern and head positioning technologies are described in the following U.S. patent documents, each of which is incorporated by reference herein: Molstad et al., U.S. Pat. No. 6,542,325, TIME-BASED SERVO FOR MAGNETIC STORAGE MEDIA, issued Apr. 1, 2003, and assigned to Imation Corp. of Oakdale, Minn.; Molstad et al., U.S. Pat. No. 6,781,778, TIME-BASED SECTORED SERVO DATA FORMAT, issued Aug. 24, 2004, and assigned to Imation Corp. of Oakdale, Minn.; and Johnson et al., U.S. Pat. No. 6,950,269, SYSTEM AND METHODS FOR USING SERVOPOSITIONING SIGNALS, issued Sep. 17, 2005, and assigned to Imation Corp. of Oakdale, Minn. These servo pattern formation technologies and head positioning algorithms allow for narrower data track definitions along the data bands, and provide for more precise data head positioning over individual data tracks. As a result, data density and read/write reliability are increased.

To further improve performance, the magnetic medium may be erased (or degaussed) before writing the servo pattern. Depending on technique, degaussing can provide the magnetic medium with a more homogeneous or isotropic domain structure, improving read and write capability for both the servo patterns and data tracks. Erasure and degaussing techniques thus impact overall performance, particularly in high capacity magnetic media with increased data rates and storage density.

SUMMARY

Exemplary embodiments of the present disclosure include systems and apparatuses for processing magnetic media. Exemplary systems include first and second tapered magnetic cores configured for positioning along the first and second opposing surfaces of a magnetic medium. The tapered cores may have a width defined with respect to the magnetic medium, where the width decreases from a first end of the tapered pole to a second end of the tapered pole. The second end of the tapered core may form a pole face adjacent the magnetic medium.

Exemplary systems may also include first and second magnetic heads comprising tapered cores positioned substantially opposite one another, adjacent the first and second major surfaces of a magnetic medium. The tapered cores may have transverse widths that decrease along the magnetic medium, toward pole faces adjacent the first and second major surfaces.

An exemplary apparatus may include first and second magnetic elements for generating flux along first and second major surfaces of a magnetic medium. The magnetic elements may have transverse magnetizations with respect to the magnetic medium, where the transverse magnetizations have a substantially opposite orientation. The magnetic elements may also be configured to generate substantially complementary longitudinal flux and substantially opposed transverse flux along a magnetic coating of the medium.

In any of the exemplary systems and the exemplary apparatus described here, the magnetic medium may comprise a magnetic tape and the magnetic coating may be configured for perpendicular recording. The magnetic coating may also comprise barium ferrite.

BRIEF DESCRIPTION OF THE DRAWINGS

FIG. 9 is a schematic view of a magnetic head assembly with a transverse field magnet.

FIG. 10 is a schematic view of a magnetic head assembly with two transverse field magnets.

DETAILED DESCRIPTION

Figure 1:
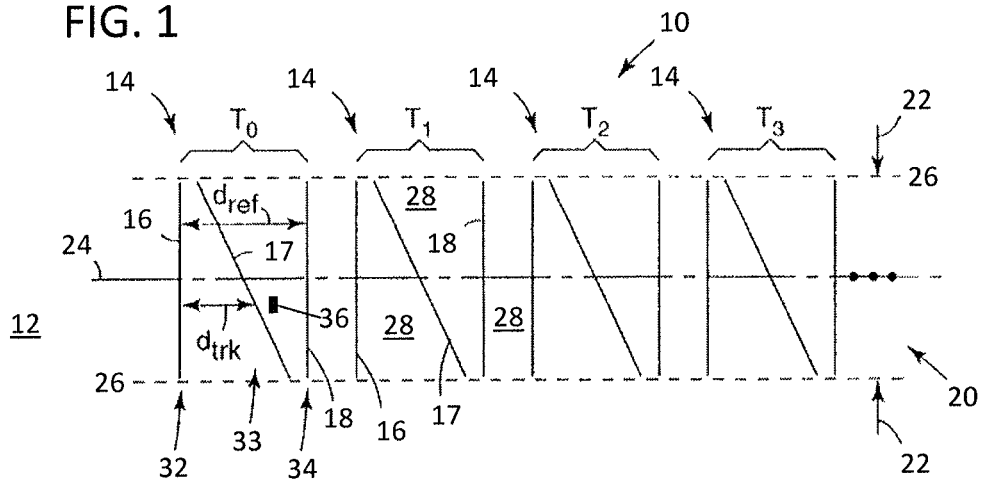
FIG. 1 is schematic illustration of a servo pattern in a magnetic recording medium, with reduced bias.

FIG. 1 is schematic illustration of servo data pattern 10 on magnetic recording medium 12. Magnetic recording medium 12 is shown in a top-down view, looking toward the magnetic surface. Pattern 10 is represented by repeated sets or frames 14 of pattern lines, for example three lines 16, 17, and 18 in an N-shaped pattern. A series of frames 14 are distributed along servo band (or track) 20, each with substantially identical pattern lines 16, 17, and 18, forming pattern 10 on magnetic medium 12.

Magnetic medium 12 is typically formed by binding a magnetic coating to a substrate or base film, for example a polymer such as polyethylene terephthalate (PET) or polyethylene naphthalate (PEN). A back coat may be applied to the surface opposite the magnetic coating, for example silicon dioxide or carbon black pigment particles (or both), in a blend of polymer resin or nitrocellulose binders to provide stiffness, reduce friction, dissipate static charge, and maintain uniform tape wind. The magnetic medium 12 can have any reasonable width, such as about 0.125 inches, about 0.25 inches, about 0.32 inches, about 0.5 inches, about 1 inch, about 2 inches, or any other reasonable width.

Suitable magnetic coatings include magnetic particles or a magnetic powder in a binder such as a thermoplastic resin. The magnetic coating may also include a head cleaning agent (HCA) such as an alumina or aluminum oxide pigment particles, abrasive grains such as silica, or both, along with other resin or binder components such as surfactants, lubricants, and hardeners.

In the particular example of FIG. 1, magnetic medium 12 is configured for perpendicular recording, for example using a barium ferrite (BaFe) coating, or another coating including perpendicularly oriented magnetic particles. Magnetic medium 12 may also include a soft magnetic underlayer (SUL) for flux return. Other materials are also suitable for the magnetic coating, such as strontium ferrite (SrFe) or cobalt ferrite (CoFe), or a combination of one or more ferrite, ferromagnetic (FM), anti-ferromagnetic (AFM), and synthetic anti-ferromagnetic (SAF), for example in a layered perpendicular magnetic recording material.

To reduce bias and improve signal performance, the magnetic domain structure may be substantially randomized in inter-pattern regions 28, between pattern lines 16, 17, and 18, and between individual frames 14. Reduced bias in magnetic medium 12 reduces amplitude asymmetry in the servo and data signals, improving system performance.

Depending on application, servo pattern 10 may extend continuously along substantially the entire length of magnetic medium 12. Alternatively, pattern 10 may be provided in particular track sectors, for example at the beginning and end of magnetic (tape) medium 12, or in periodic locations along magnetic medium 12. In some applications, pattern 10 can be provided on non-tape-based magnetic media 12, for example a magnetic disc or pattern media.

Pattern 10 may also represent more generalized data in a data band 20, for example generic binary data stored in a perpendicular or longitudinal recording medium, such as a magnetic tape or a magnetic disc, or analog data on an analog medium. It is to be appreciated that references herein to direction, including but not limited to perpendicular, parallel, transverse, longitudinal, etc., are to be understood as not being mathematically precise unless otherwise indicated, and that each of these types of terms is substantially or generally directional. For example, references to "perpendicular" can be understood to include "transverse", and vice versa, where context would indicate meaning. In these applications, reduced bias in magnetic medium 12 also reduces asymmetry in the signal from the data head (or read/write head), further improving system performance by increasing speed and reliability for data read and write operations. Width 22 of band 20 is defined generally perpendicularly (or orthogonally) to center line 24 of pattern 10, between lateral edges or sides 26 (dashed lines), such as transverse to a travel direction along the magnetic media. Sides 26 define the lateral boundaries of pattern lines 16, 17, and 18 in each frame 14.

Servo pattern lines 16, 17, and 18 can be simultaneously recorded in each servo frame 14 to reduce sensitivity to recording speed. For example, pattern lines 16, 17, and 18 in individual servo frames 14 may be written at times $t_0$, $t_1$, $t_2$, etc., as shown in FIG. 1. Thus, the geometry and relative positions of servo pattern lines 16, 17, and 18 may be substantially identical in each servo frame 14. The recording times and corresponding spacing may be periodic, or aperiodic.

Although lines 16, 17, and 18 are shown as individual pattern lines, in a preferred embodiment, each line can be recorded multiple times in parallel in each frame, such as about four or five or some other number of times. This has the effect that line 16, recorded as four or five (or some other number) of lines, can be more easily recognized than a single line. Similarly, lines 17 and 18 can be recorded multiple times in parallel in each frame, with the effect that lines 17 and 18, recorded as four for five (or some other number) of lines, can be more easily recognized than a single line.

As shown in FIG. 1, individual servo frames 14 each include three servo lines 16, 17, and 18, forming an "N" pattern. Reference lines 16 and 18 are recorded in first and second servo pattern reference regions 32 and 34, respectively, extending transversely or substantially perpendicularly to center line 24. Servo pattern line 17 extends diagonally across servo pattern region 33 at a skew angle with respect to center line 24, between first reference region 32 and second reference region 34. Servo pattern line 17 also makes a skew angle with respect to reference lines 16 and 18, forming the N-shaped pattern ("I\I") of each servo frame 14.

Servo patterns 10 are written to magnetic medium 12 during the manufacturing or formatting process, and are used as a reference to position the data heads for reading and writing to data tracks over the life of the tape cartridge or other magnetic storage device. As magnetic medium 12 translates along center line 24 of band 20, read head 36 crosses a series of magnetic transitions at the leading and trailing edges of pattern lines 16, 17, and 18, generating a corresponding series of servo signals or servo read pulses.

Servo signal timing depends on the relative position and magnetic polarization states of servo pattern lines 16, 17, and 18. As shown in FIG. 1, reference lines 16 and 18 define reference distance $d_{ref}$, which can be relatively constant across width 22 of band 20. (While a relatively constant reference distance $d_{ref}$ can be preferred in many embodiments, in the context of the invention, there is no particular requirement for any such limitation.) Servo pattern line 17 defines tracking distance $d_{trk}$, which varies across width 22 of band 20.

The servo read pulses are defined by time intervals corresponding to reference distance $d_{ref}$ and tracking distance $d_{trk}$. The time intervals are used to generate a position signal for read head 36, based on the ratio $d_{trk}/d_{ref}$. As shown FIG. 1, for example, a lower ratio may indicate a position toward the top of band 20, and a higher ratio may indicate a position toward the bottom of band 20. The servo signals are used to position read/write (data) heads along data tracks in the data bands, extending between adjacent servo bands 20.

The servo pattern can also be reversed, forming a "|/|" or "inverted N" servo frame. Alternatively, a two-line servo pattern may be used, for example a "V" shape (either "\/" or "/\"). Other patterns include two, three or more different reference and servo pattern lines 16, 17, and 18. The servo lines themselves can also have different shapes, for example using a combination of straight, curved, arcuate or chevron-shaped segments.

In longitudinal media, servo pattern lines 16, 17, and 18 represent regions where magnetic domains in the magnetic coating are preferentially oriented along the plane of magnetic medium 12, for example parallel or anti-parallel to the media travel direction. In perpendicular media, the magnetic domains are preferentially oriented in an orthogonal direction with respect to the magnetic coating, either into or out of the plane of magnetic medium 12. Because of this preferential domain orientation, it is beneficial to erase magnetic medium 12 before writing servo pattern 10, in order to reduce residual bias and obtain a servo read signal with symmetric amplitude (that is, with equal positive and negative signal excursions).

It should be recognized that the present invention may be used with any suitable type of tape or any suitable type of media, as desired. In particular, the techniques described here are not limited to magnetic tape-based digital storage media and magnetic disc storage media. In addition, these techniques are also suitable for use with other media where reduced (e.g., perpendicular, transverse, or otherwise) bias may be desired, including, but not limited to, analog audio tape, analog video tape, and other analog media, pattern media, and magnetoresistive storage media, e.g., for use with magnetoresistive random access memory (or MRAM) storage devices and systems.

To reduce bias in the position error signal (PES), or other signal from read head 36, the net magnetic moment (or bias) should be small in inter-pattern regions 28, so that transitions to both polarity states are equally strong (that is, symmetric). Where magnetic medium 12 has a net bias (or non-zero moment), on the other hand, the transitions at pattern lines 16, 17, and 18 may be stronger (or enhanced) for one polarity as compared to the other. To reduce or minimize such signal bias and asymmetry effects, magnetic medium 12 is processed with increased longitudinal bias, and reduced perpendicular bias.

Figure 2:
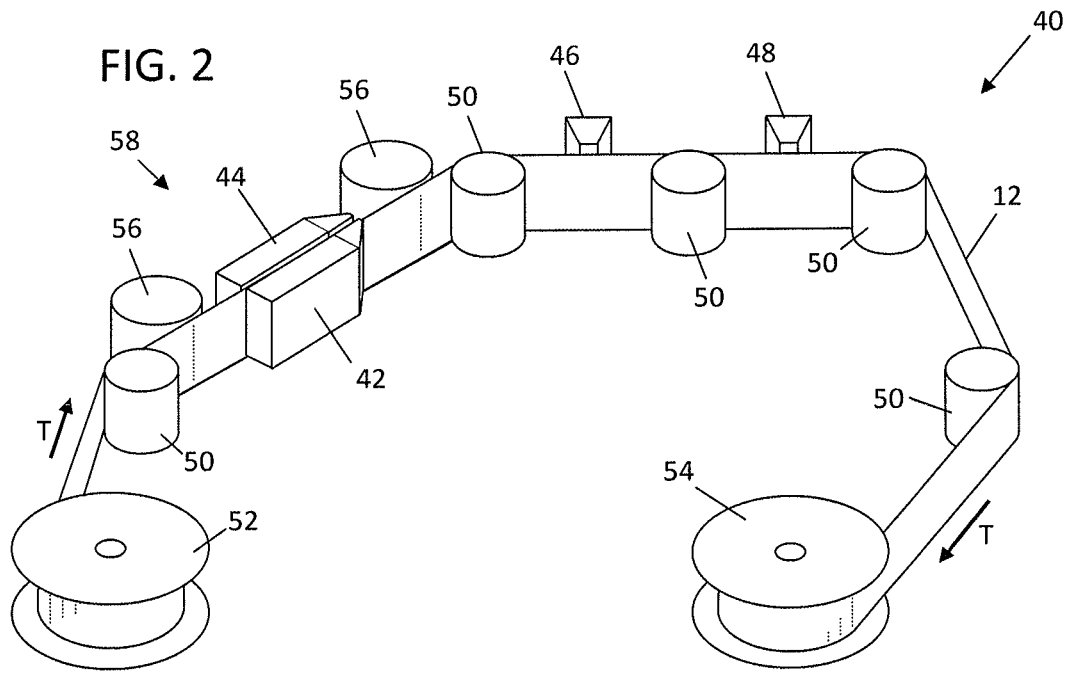
FIG. 2 is a schematic view of a system for reducing bias in a magnetic medium.

FIG. 2 is a schematic view of system 40 for processing magnetic (e.g., tape) medium 12, with reduced bias in the magnetic coating (or recording layer). In this particular example, system 40 includes first and second magnetic elements (or head sections) 42 and 44, write head 46, read head 48, and guides 50. Depending on application, system 40 may also include other components for processing magnetic medium 12, including, but not limited to, tension control devices, vacuum columns, polishing and cleaning elements, and additional heads or other magnetic components for further read, write, erase, and formatting operations on magnetic medium 12. Alternatively, system 40 operates on a non-tape based magnetic medium 12, for example a magnetic disc, pattern media, or a magnetoresistive medium.

Guides (or rollers) 50 guide magnetic medium 12 through system 40 along media travel direction T (arrows), from supply reel 52 to takeup reel 54. Additional guides 56 may be provided within head assembly 58, in order to position magnetic medium 12 between head sections (or heads) 42 and 44, respectively.

Typically, guides 50 and 56 are formed of nonmagnetic materials. Where magnetic materials are used, they may affect the fields, for example where guides 56 are positioned relatively close to head sections 42 or 44 of assembly 58.

Head sections 42 and 44 encompass DC bias elements, erase heads, and other magnetic elements for erasing, biasing, or formatting magnetic medium 12. Generally, head sections 42 and 44 are positioned along and opposite sides of magnetic medium 12, for example with first head section 42 adjacent one surface of the magnetic medium 12, and second head section 44 adjacent a second surface of the magnetic medium.

Head assembly 58 is configured with tapered pole elements on head sections 42 and 44, in order to provide a large-magnitude longitudinal field component along the plane of magnetic medium 12, with a relatively small perpendicular field component into or out of the plane of magnetic medium 12. System 40 thus provides high longitudinal bias along the magnetic coating layer of magnetic medium 12, with reduced or minimized perpendicular bias, as compared to the longitudinal component.

Head assembly 58 allows write head 46 of system 40 to generate servo tracks and other data patterns on magnetic medium 12 with reduced bias, for increased symmetry and improved signal-to-noise ratio in corresponding signals S from read head 48. As a result, system 40 provides increased performance for read and write operations on magnetic medium 12, with enhanced data rates and storage capacity. The degree of bias reduction depends upon the particular structure of head assembly 58, which takes on a number of different forms as described below.

Figure 3:
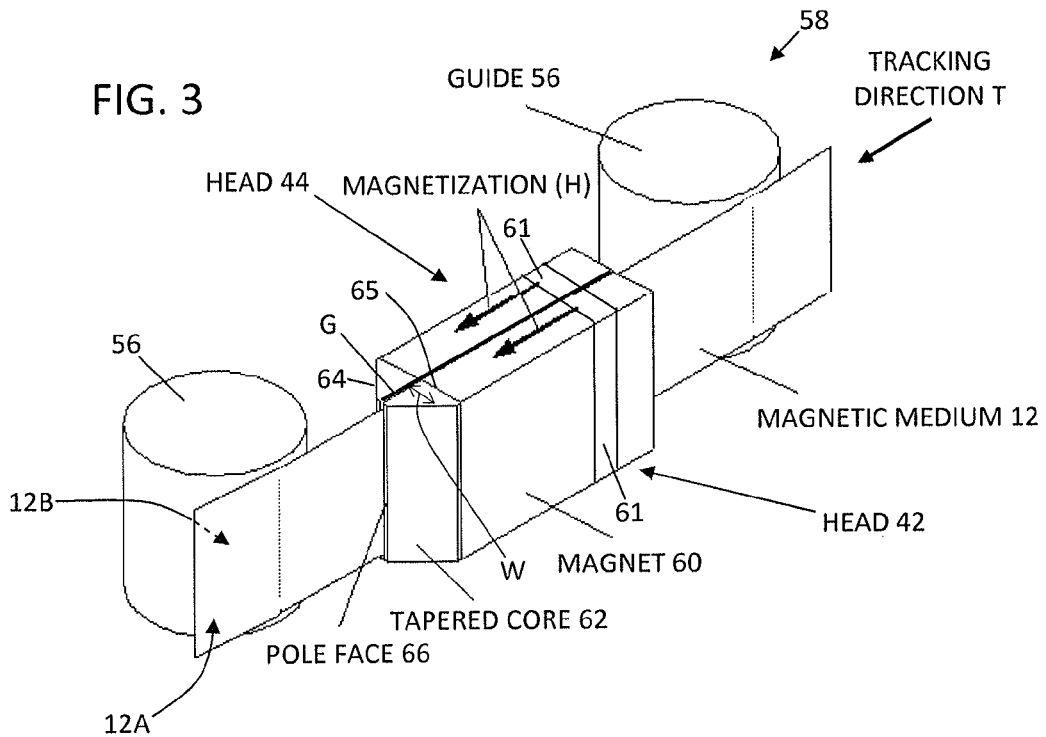
FIG. 3 is a schematic view of a magnetic head assembly with a triangular tapered core configuration.

FIG. 3 is a schematic view of magnetic head assembly 58, in a tapered triangular pole configuration. Head assembly 58 is suitable for processing magnetic medium 12 in conjunction with reduced-bias system 40, as described above, or in another formatting, erasure or data storage (read/write) operation on magnetic medium 12.

Magnetic medium 12 has first side or surface 12A and second side or surface 12B, opposite first surface 12A. First surface 12A may include a magnetic coating, as described above, for example a perpendicular or longitudinal recording layer, or another layer or coating for recording magnetic data. Second surface 12B of magnetic medium 12 may include a back coat or other coating layer 12B, or a bare substrate. The orientations and coating characteristics of first and second surfaces 12A and 12B may also be reversed across magnetic medium 12, without loss of generality. In other embodiments, both sides of the tape may include a magnetic coating.

In the particular configuration of FIG. 3, head assembly 58 includes first head section 42 and second head section 44 on opposite sides 12A and 12B of magnetic medium 12. Magnetic medium 12 propagates through head assembly 58 along media travel direction T, and with one or more guides 56 to position magnetic medium 12 between magnetic head sections 42 and 44.

Head sections 42 and 44 include magnetic field elements (magnets) 60 and magnetic cores 62 with tapered poles (or pole portions) 64 extending from first end 65, adjacent magnet 60, to second end or pole face 66. Magnets 60 provide magnetic flux, for example in the form of permanent iron, ferrite, alnico, or rare earth magnets. Example rare earth magnets can include neodymium and samarium-cobalt. In the particular example of FIG. 3, magnets 60 have generally longitudinal magnetization H, aligned substantially along or parallel to the plane of magnetic medium 12.

Electromagnets with coils 61 may also be used to generate flux, either alone or in combination with permanent magnets 60. In coil-based applications, the flux density scales with coil current, until cores 62 become saturated. Thus, coils 61 can be used to adjust the field strength along magnetic medium 12, for example by individually adjusting the current in coils 61 to reduce transverse bias in the magnetic coating.

Magnetic core 62 and tapered poles 64 may be formed of high permeability, low coercivity, high saturation magnetic materials, for example a ferromagnetic alloy or other suitable magnetic material. Magnetic flux is guided through cores 62 to provide high longitudinal flux density in tapered poles 64, and extending from pole faces 66 adjacent magnetic medium 12.

Transverse width W of tapered pole 64 is taken perpendicular to the plane of magnetic medium 12. Tapered cores 64 have decreasing width W along magnetic medium 12, from first end 65 to second end (or pole face) 66, increasing longitudinal flux density and field strength along the magnetic coating.

Tapered cores 64 thus function to concentrate magnetic flux in the proximity of the magnetic medium 12. In particular, tapered pole 64 has smaller surface area at pole face 66 than at first end 65, increasing the flux concentration so that the field strength is greater than in other designs. In one particular example, width W of tapered pole 64 decreases generally linearly along media travel direction T, forming a substantially triangular configuration along magnetic medium 12, from first end 65 of tapered pole 64 to pole face 66.

Relatively flat pole faces 66 may be formed transversely to magnetic medium 12, in order to provide more uniform fields across gap G, where magnetic medium 12 exits from between tapered poles 64. Thus, pole faces 66 may be formed with surface area A greater than or equal to the area of gap G, or greater than or equal to about twice the area of gap G. Once the area of pole surfaces 66 is substantially larger than the area of gap G, however, further increases have diminishing returns. One or both pole faces 66 may also include curved, beveled, or skew surfaces, either to modify the field configuration along magnetic medium 12, or for structural purposes.

Head assembly 58 may also include additional magnetic components for processing magnetic medium 12, including, but not limited to, erase heads, write heads, read heads, and other magnetic components. In addition, head sections 42 and 44 may be aligned at substantially the same longitudinal position along magnetic medium 12, or offset. Head sections 42 and 44 may also be located on the same side of magnetic medium 12, or combined into a single head assembly or structure. Thus, the designations "first" and "second" head sections 42 and 44 are merely illustrative, and do not necessarily indicate any particular number or position along media travel direction T, or any particular order of operation on magnetic medium 12.

In alternative embodiments, a relative distance between the magnetic medium 12 and the tapered pole 64 can be responsive to longitudinal distance (that is, along media travel direction T, or its opposite) from the coils 61, within a reasonable range.

While particular element configurations, shapes, and sizes are described in this application, in the context of the invention, there is no particular requirement for any of these to be limitations. For a first example, the pole faces 66 may instead have less width or less area than the gap G. For a second example, the positions of one or both pole faces 66 might be adjusted to optimize (or otherwise adjust) a magnetization orientation of the magnetic medium 12. For a third example, a current used to provide magnetic fields across the gap G might be adjusted. For a fourth example, while the guides for the magnetic medium 12 are shown as round in the figure, they could be another shape, such as one that could fit closer to the magnetic head or one that could control the position of the magnetic medium 12 more accurately. After reading this application, those skilled in the art would recognize other and further modifications, not requiring undue experiment or further invention, which would also work, and are within the scope and spirit of the invention.

Figure 4:
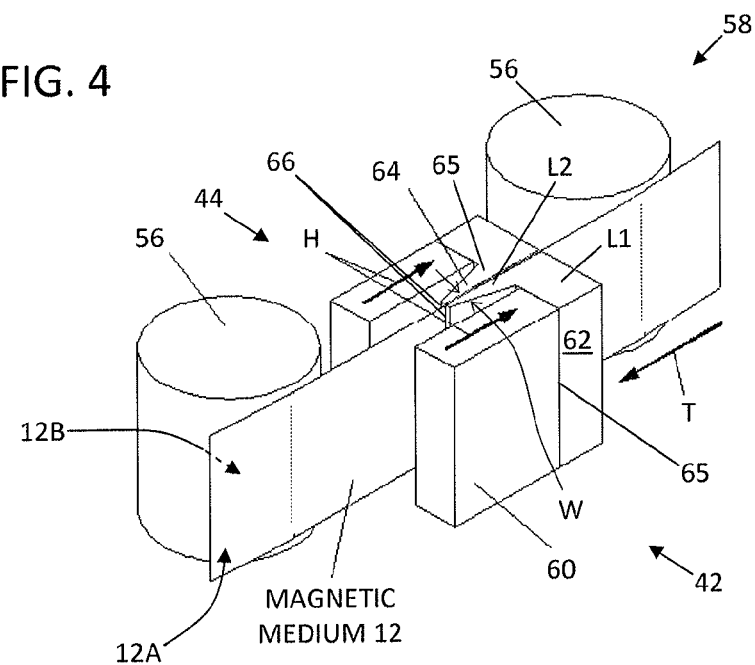
FIG. 4 is a schematic view of a magnetic head assembly with a tapered L core configuration.

FIG. 4 is a schematic view of head assembly 58, with magnetic cores 62 having a tapered L configuration. In this particular example, head sections 42 and 44 each have magnets 60 for producing flux and magnetic cores 62 for directing the flux along tapered pole segments 64.

As shown in FIG. 4, tapered L cores 62 include first (transverse) leg L1 and second (longitudinal) leg L2. First leg L1 extends transversely or substantially perpendicular to magnetic medium 12, from magnet 60 to first end 65 of tapered pole 64. Second leg L2 extends longitudinally or substantially parallel to magnetic medium 12, from first leg portion L1 at first end 65 of tapered pole section 64 to pole face 66.

First and second legs L1 and L2 may thus be substantially perpendicular, as shown in FIG. 4. Legs L1 and L2 may also meet at a skew angle, for example between about zero degrees and about ninety degrees, and second leg L2 may extend at a corresponding skew angle with respect to magnetic medium 12.

Magnetic cores 62 guide flux from magnets 60 to tapered poles 64. Tapered poles 64 have decreasing transverse width W along magnetic medium 12, as described above, in order to concentrate longitudinal flux at pole faces 66, adjacent first and second surfaces 12A and 12B of magnetic medium 12.

Tapered L cores 62 thus direct magnetic flux generally perpendicularly with respect to magnetization M of magnet 60 in first leg L1, and generally oppositely to magnetization M in second leg L2. This configuration reduces the reluctance of the magnetic paths through head sections 42 and 44, and increases the longitudinal field at pole faces 66. As a result, assembly 58 provides lower reluctance and greater field strength than other designs.

Figure 5:
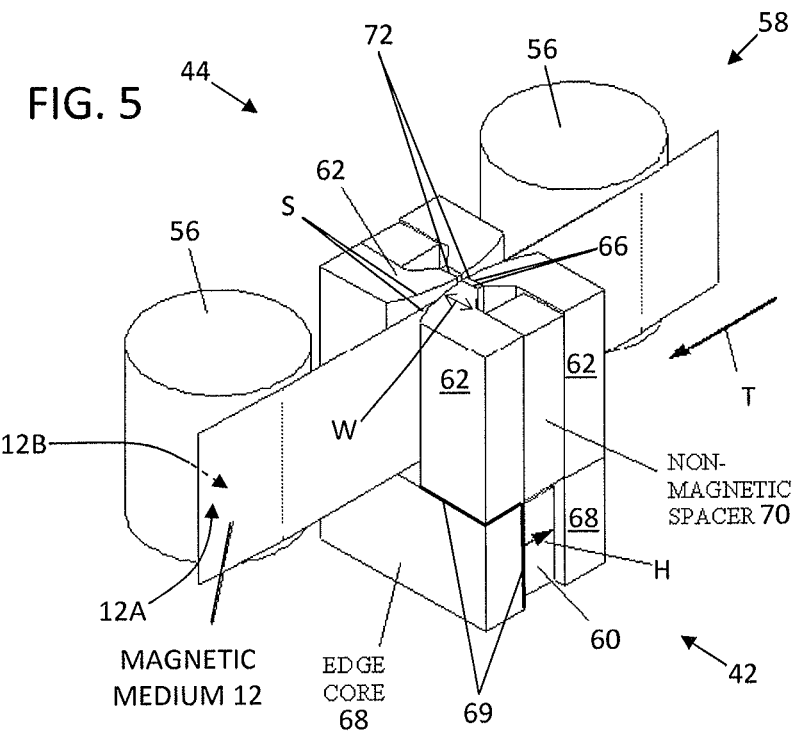
FIG. 5 is a schematic view of a magnetic head assembly with a single magnet configuration.

FIG. 5 is a schematic view of head assembly 58, in a single magnet configuration. In this example, magnet 60 extends transversely across the bottom edge of magnetic medium 12, in order to provide magnetic flux to tapered cores 62 on opposing head sections 42 and 44.

Edge cores 68 are magnetically coupled to opposite sides of magnet 60. Edge cores 68 extend transversely along magnet 60, from first head section 42, adjacent first surface 12A of magnetic medium 12, to second head section 44, adjacent second surface 12B.

In addition, magnetic head sections 42 and 44 each have two generally opposed tapered cores 62, as shown in FIG. 5. Tapered cores 62 are coupled to edge cores 68 on opposite sides of magnet 60, and are separated by non-magnetic spacers 70. Spacers 70 may be formed of an insulator such as glass, silica, or alumina, or a non-magnetic metal such as titanium, or a copper alloy, etc.

Two tapered cores 62 are provided along each surface 12A and 12B of magnetic medium 12, extending transversely to media travel direction T from edge cores 68 at the bottom edge of magnetic medium 12, toward the top edge of magnetic medium 12. Alternatively, the orientation of magnetic head assembly 58 can be reversed, with magnet 60 and edge cores 68 extending across the top edge of magnetic medium 12, and tapered cores 62 extending from the top edge toward the bottom edge of magnetic medium 12.

Tapered cores 62 have transverse width W along magnetic medium 12, where width W decreases toward pole faces 66 in order to concentrate longitudinal flux across magnetic gaps 72. Magnetic gaps 72 are positioned adjacent first and second surfaces 12A and 12B of magnetic medium 12, generating a magnetic field across pole faces 66 to erase data from the recording layer.

Tapered cores 62 may have curved or arcuate sides S, as shown in FIG. 5, with transverse width W decreasing non-linearly toward opposing pole faces 66. Tapered cores 62 curve away from magnetic gaps 72 along curved sides S, increasing the spacing from magnetic medium 12 to produce a low reluctance magnetic path. This configuration also provides high field strength adjacent magnetic gaps 72, with reduced field strength along the leading and trailing edges of head sections 42 and 44 to preserve the magnetic bias of magnetic medium 12.

Thus, the taper of cores 62 is configured to concentrate flux where it is needed at gaps 72, along magnetic medium 12 between opposing pole faces 66. Curved sides S of tapered cores 62 reduce magnetic field strength along the leading and trailing edges of head sections 42 and 44, so that the magnetization provided to magnetic medium 12 at gaps 72 is not altered.

Gaps 72 may overlap across magnetic medium 12, or be generally aligned along media travel direction T, or both, in order to provide a stronger, more uniform longitudinal field. It may also be desirable to increase or reduce the field strength, in order to provide more control of the perpendicular bias in the magnetic coating. Magnetic gaps 72 may thus be formed as air gaps, or filled with a nonmagnetic material to control the field strength along magnetic medium 12.

In addition, magnets 60 with different magnetizations H may be used, and the dimensions of gaps 72 and the taper of cores 62 can be adjusted to direct more or less flux along magnetic medium 12, or to limit the transverse fields. Non-magnetic spacer materials 69 may also be provided, for example between edge cores 68 and magnet 60, or between edge cores 68 and tapered cores 62, in order to adjust the magnetic coupling strength and control the corresponding longitudinal and transverse fields at gaps 72.

Figure 6:
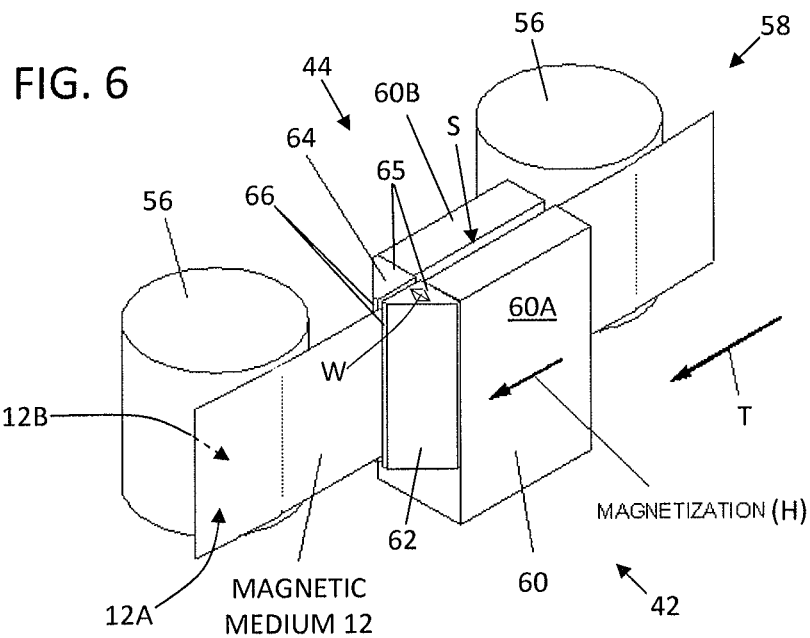
FIG. 6 is a schematic view of a magnetic head assembly with a slotted magnet configuration.

FIG. 6 is a schematic view of head assembly 58 with slotted magnet 60 and tapered cores 62 with triangular poles 64. In this configuration, head sections 42 and 44 are formed from a single magnet 60, with magnetic medium 12 positioned in slot S. Slot S separates magnet 60 into two portions or sides 60A and 60B, for example with portion 60A adjacent first surface 12A of magnetic medium 12 (in head section 42), and portion 60B adjacent second surface 12B (in head section 44)

As shown in FIG. 6, magnet 60 extends across the bottom edge of magnetic medium 12, from first surface 12A to second surface 12B. Slot S is formed in the top surface of magnet 60, with guides 56 to position magnetic medium 12 between sides 60A and 60B. Alternatively, the orientations of magnetic head assembly 58 may be reversed, for example with slot S formed in the bottom of magnet 60, or with sides 60A and 60B positioned along the opposite surfaces of magnetic medium 12.

Tapered poles 64 have decreasing width W along magnetic medium 12 to increase longitudinal flux density at pole surfaces 66, as described above. In particular, transverse width W of each tapered pole 64 decreases from first end 65, adjacent first or second portion 60A or 60B of magnet 60, to pole face 66, opposite first end 65.

Figure 7:
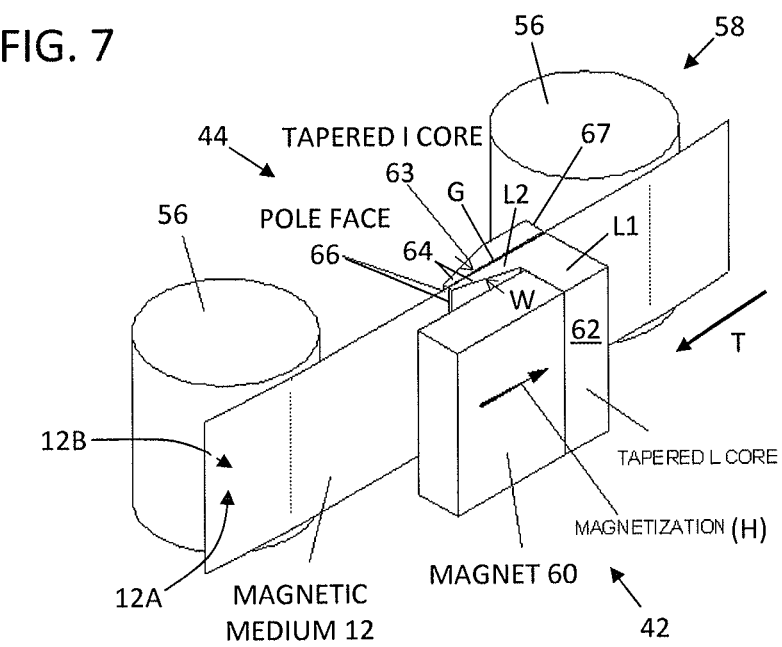
FIG. 7 is a schematic view of a magnetic head assembly with tapered L and tapered I cores.

FIG. 7 is a schematic view of head assembly 58 with a tapered L core 62 and tapered "I" shaped core 63. In this configuration, head section 42 includes magnetic element 60 coupled to tapered L (or near) core 62, on first side 12A of magnetic medium 12. Head section 44 includes tapered I (or far) core 63, which is coupled to tapered L core 62 and magnet 60 across air gap G.

Tapered L core (or pole) 62 is directly coupled to magnet 60, for example in an adjacent and abutting relationship, in order to produce a magnetic field along first surface 12A of magnetic medium 12. Tapered I core (or pole) 63 is magnetically coupled to near core 62 across air gap G, and through magnetic medium 12. Tapered L (near) core 62 thus drives tapered I (far) core 63, where the reluctance of the magnetic coupling is determined by the area of air gap G between cores 62 and 64, divided by the space between.

Tapered L core 62 and tapered I core 63 each extend longitudinally along magnetic medium 12 with decreasing transverse width W, in order to increase longitudinal flux density at pole faces 66, adjacent magnetic medium 12. The location of tapered I core 63 can be varied with respect to tapered L core 62 in order to control the longitudinal field strength or compensate for the perpendicular component, for example by increasing or decreasing the width of gap G, or by aligning or offsetting pole faces 66 along tracing direction T.

In the particular example of FIG. 7, first (transverse) leg L1 of tapered L core 62 extends transversely or substantially perpendicular to magnetic medium 12, from magnet 60 to second (longitudinal) leg L2. Second (longitudinal) leg L2 extends along or substantially parallel to magnetic medium 12, with reducing transverse width W along tapered pole portion 64, in the direction from first leg L1 to pole face 66.

Tapered I core 63 extends from first end 67, substantially aligned with the leading edge of tapered L core 62, to a second end at pole face 66. Width W of tapered I core 63 also decreases along tapered pole portion 64, in the direction of pole face 66.

Figure 8:
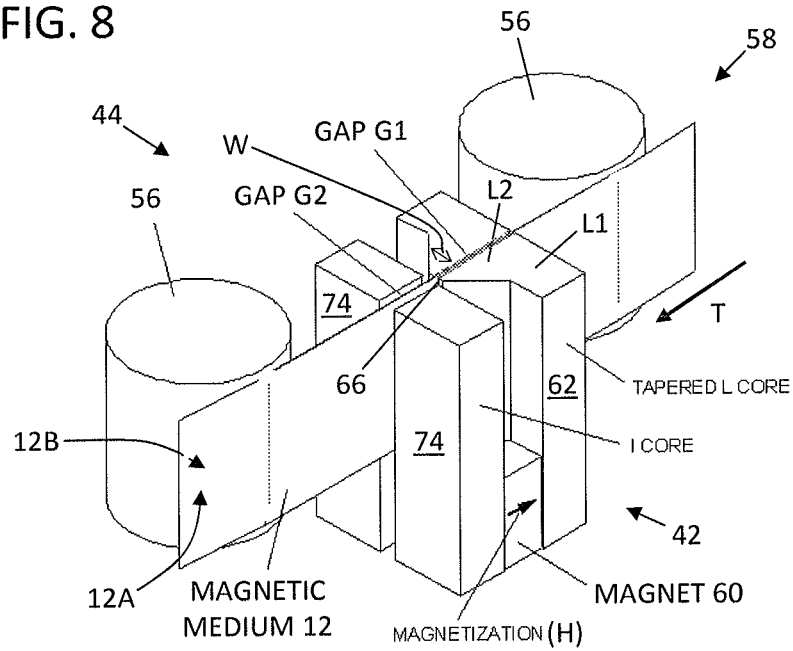
FIG. 8 is a schematic view of a magnetic head assembly with tapered L and trailing edge cores.

FIG. 8 is a schematic view of head assembly 58, with tapered L cores 62 and untapered I or trailing edge cores 74. Magnets 60 are coupled to tapered L cores 62 and trailing edge cores 74 on both sides of magnetic medium 12, in head sections 42A and 42B. Alternatively, a single magnet 60 may extend across the bottom edge of magnetic medium 12, as described above.

In the particular example of FIG. 8, tapered L cores 62 are positioned along opposite surfaces 12A and 12B of magnetic medium 12. Trailing edge cores 74 are spaced from tapered L cores 62 in a trailing sense with respect to media travel direction T, in generally opposed locations across magnetic medium 12. Magnetic medium 12 tracks through first air gap G1, between tapered L cores 62, and second air gap G2, between trailing edge cores 74.

Tapered L cores 62 extend from first leg L1 adjacent magnet 60 to second leg L2 adjacent magnetic medium 12. Second legs L2 of tapered L cores 62 form tapered poles with decreasing width W along magnetic medium 12, in the direction of pole faces 66.

Trailing edge cores 74 may be formed of soft magnetic materials similar to those of tapered L cores 62, or other suitable magnetic materials. Trailing edge cores 74 extend perpendicularly from magnetic medium 12, in a substantially opposed configuration across first and second surfaces 12A and 12B.

Trailing edge cores 74 are spaced from magnetic medium 12 across gap G2. The width of gap G2 is selected to be sufficiently large to prevent cores 74 from substantially altering the magnetization of magnetic medium 12, and sufficiently small to produce a lower reluctance path for the return of magnetic flux to tapered poles 62. In the particular configuration of FIG. 8, for example, gap G2 across trailing edge cores 74 may be may be at least as large or larger than gap G1 across tapered L cores 62, in order to reduce reluctance of the magnetic path without modifying the magnetic field orientation in the recording layer of magnetic medium 12. Thus, the width of gap G2 may be greater than or about equal to the width of gap G1 (i.e., G2≥G1), greater than or equal to about twice the width of gap G1 (G2≥2 G1), or greater than or equal to about five times the width of gap G1 (G2≥5 G1), or any other desired relationship.

FIG. 9 is a schematic view of head assembly 58 with longitudinal and transverse field magnets 60 and 76, respectively. In this example, head section 42 includes tapered L core 62 coupled to longitudinal field magnet 60, with magnetization H oriented along or substantially parallel to the plane of magnetic medium 12. Head section 44 includes tapered I core 63 spaced from transverse field magnet 76, with magnetization H oriented transversely or substantially perpendicular to the plane of magnetic medium 12.

Tapered L core has first leg L1 extending transversely from longitudinal field magnet 60 toward magnetic medium 12, and second leg L2 extending longitudinally and with decreasing width W toward first pole face 66, adjacent first surface 12A of magnetic medium 12. Tapered I pole 63 extends with decreasing width from first end 67 toward second pole face 66, adjacent second surface 12B.

Transverse field magnet 76 is formed of a permanent ferrite magnet, an electromagnetic coil, or combination of permanent and electromagnetic components, as described above for longitudinal magnet 60. Magnets 76 with magnetization H oriented transversely to the plane of magnetic medium 12 can be used to reduce or minimize (zero or null) the perpendicular field components along the magnetic coating. The value of transverse magnetization H and the position of magnet 76 may also adjusted with respect to magnetic medium 12, in order to increase or decrease the longitudinal and perpendicular field components.

As shown in FIG. 9, for example, transverse field magnet 76 is longitudinally spaced from pole face 66 of tapered I core 63 along media travel direction T, and transversely spaced from second surface 12B of magnetic medium 12. In this configuration, transverse field magnet 76 may also reduce reluctance in the magnetic circuit, while increasing longitudinal magnetization along magnetic medium 12 and decreasing perpendicular bias in the magnetic coating.

In some designs, magnet 76 is manually positioned with respect to magnetic medium 12 and pole faces 66. In other designs, actuator 78 is provided to automatically position magnet 76 using control or feedback signal S, for example based on signal bias or asymmetry in signal S from a servo or other read head 48, as described above with respect to system 40.

FIG. 10 is a schematic view of head assembly 58 with two transverse or perpendicular field magnets 76. In this particular configuration, head sections 42 and 44 each include a transverse field magnet 76, in generally opposed positions across first and second surfaces 12A and 12B of magnetic medium 12.

Transverse field magnets 76 generate longitudinal field components along magnetic medium 12 based on the return path for magnetic flux. Gap spacing G may thus be relatively small, in order to increase flux density along the recording layer. In addition, the transverse and longitudinal positions of magnets 76 may be adjusted in order to control the corresponding magnetic field components, in order to provide full erasure of magnetic medium 12 with reduced perpendicular bias in the magnetic coating.

In some of these designs, magnets 76 are manually positioned, and in other designs actuator 78 is provided to automatically position magnets 76 based on feedback or control signal S, as described above. Alternatively, actuator 78 may be coupled to one or more guides 56, in order to position magnetic medium 12 with respect to transverse field magnets 76, or other components of head assembly 58.

Figure 11:
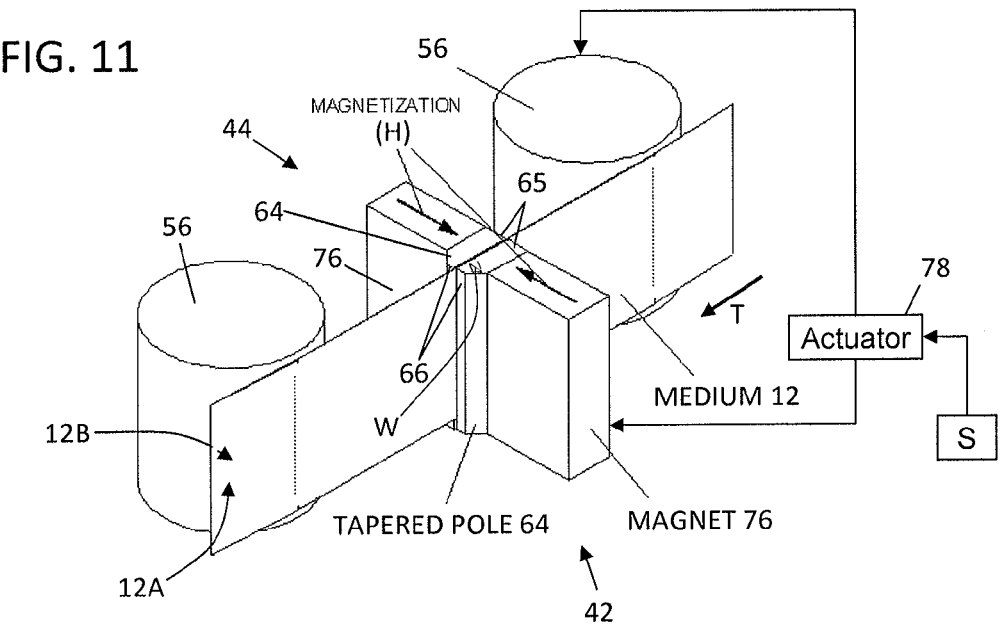
FIG. 11 is a schematic view of a magnetic head assembly with transverse field magnets and tapered L poles.

FIG. 11 is a schematic view of head assembly 58 with transverse field magnets 76 and tapered magnetic cores (or poles) 64. Tapered cores 64 may be directly coupled to magnets 76, with reduced transverse width W along magnetic medium 12 to increase longitudinal flux at pole faces 66.

As shown in FIG. 11, head sections 42 and 44 are substantially symmetric across magnetic medium 12, with tapered cores 64 extending from first ends 65 to second ends (or pole faces) 66, in substantially the same positions along media travel direction T. In other configurations, head sections 42 and 44 may be offset along media travel direction T, and the head-media spacing may vary with respect to surfaces 12A and 12B.

In some of these applications, actuator 78 is provided to position one or both of head sections 42 and 44 with respect to magnetic medium 12, in order to reduce or minimize transverse field components along the magnetic coating. In other applications, actuator 78 may be coupled to one or more guides 56, as described above. Alternatively, head sections 42 and 44 may be manually positioned with respect to magnetic medium 12.

Figure 12:
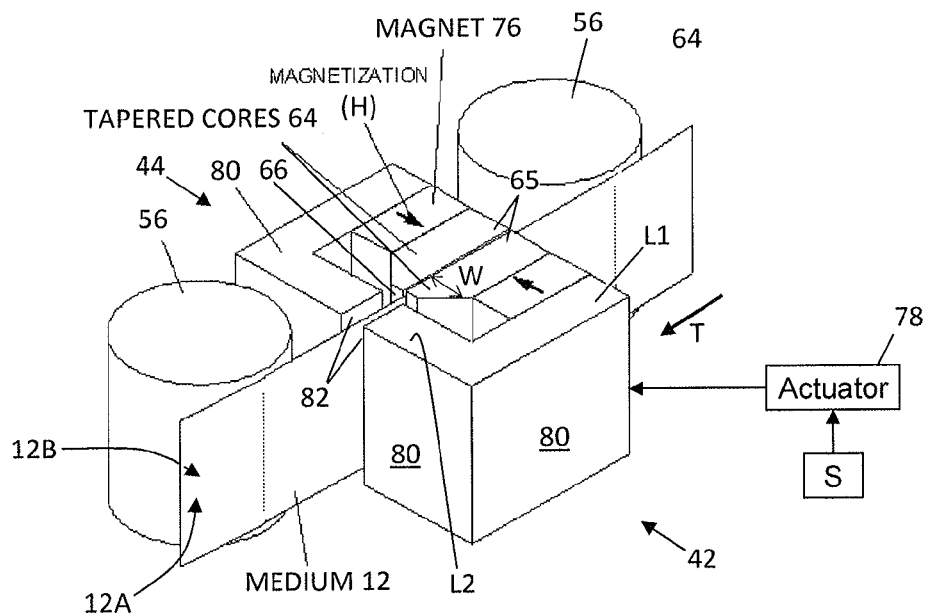
FIG. 12 is a schematic view of a head assembly with transverse field magnets and trailing edge cores.

FIG. 12 is a schematic view of head assembly 58 with tapered cores 62 and trailing edge poles 82 in each of head sections 42 and 44. As shown in FIG. 12, tapered cores 62 are positioned along opposite surfaces 12A and 12B of magnetic medium 12, and coupled to magnets 76 with transverse magnetization H.

Additional (untapered) L-shaped cores 80 are also coupled to each magnet 76, opposite tapered cores 62. L-shaped cores 80 extend from magnets 76 along first (longitudinal) leg L1 and second (transverse) leg L2 to trailing edge pole faces 82. Trailing edge pole faces 82 are spaced along media travel direction T from tapered pole faces 66, in substantially opposed positions across magnetic medium 12, adjacent opposite surfaces 12A and 12B. In alternative embodiments having trailing edge pole faces 82, those trailing edge pole faces 82 may be curved, tapered, or otherwise disposed away from the tape, with the effect that a spacing between the tape and the trailing edge pole faces 82 increases as the tape is moved.

Trailing pole faces 82 are spaced from magnetic medium 12 to reduce reluctance without substantially altering the magnetization of the recording layer, as described above. In some applications, actuator 78 is provided to position pole faces 82, or other components of head assembly 58, with respect to magnetic medium 12.

In additional designs, magnets 76 may be provided with substantially opposite transverse magnetizations H, as compared to FIG. 12. In further designs, either or both of magnets 60 and 76 may be provided with substantially longitudinal or substantially transverse magnetization H. Magnetization H can also be oriented vertically upward or downward along the plane of magnetic medium 12, substantially perpendicular to media travel direction T. Alternatively, magnetization H may be oriented at a skew angle with respect to magnetic medium 12, with a combination of transverse and longitudinal field components.

Figure 13:
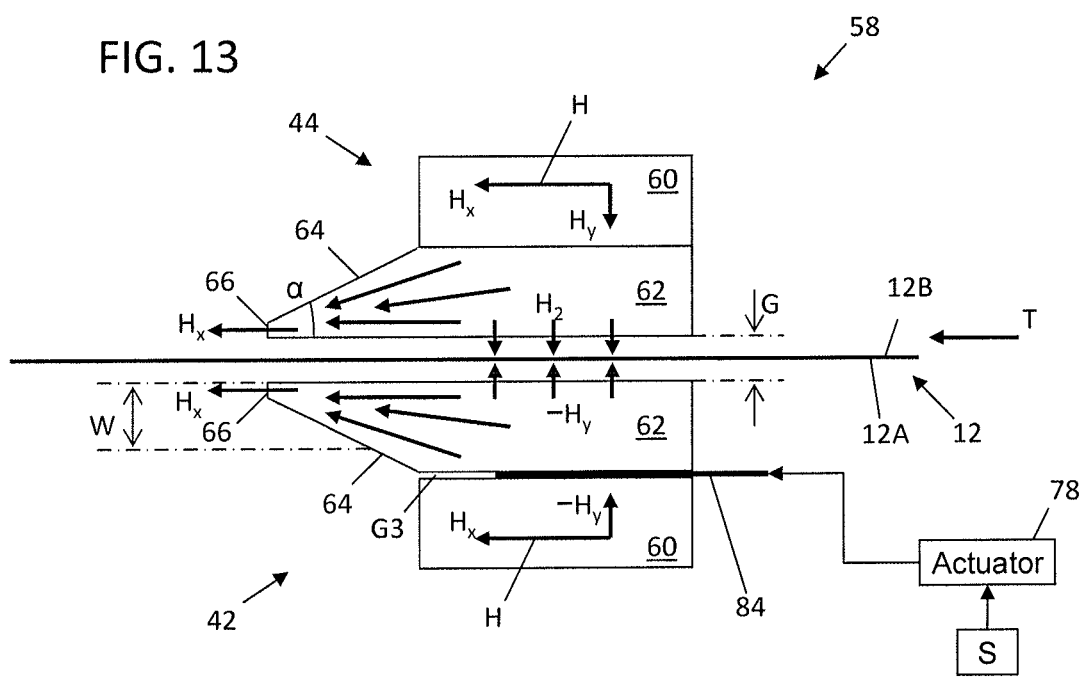
FIG. 13 is a schematic view of a magnetic head assembly illustrating longitudinal and transverse magnetic field components.

FIG. 13 is a schematic view of head assembly 58, illustrating longitudinal and transverse magnetic field components $H_x$ and $H_y$, respectively. In this particular example, each head section 42 and 44 includes magnet 60 and magnetic core 62 with tapered pole section 64.

Magnetic medium 12 has first and second major opposing surfaces 12A and 12B, positioned between head sections 42 and 44 with gap spacing G. Medium 12 travels through head assembly 58 along media travel direction T, for example from right to left as shown in FIG. 13, or from left to right.

Depending on application, magnetic medium 12 may be formed as a tape-based storage medium with longitudinal or perpendicular magnetic coating layer 12A, and a back coat, substrate, or other opposing surface 12B. For example, magnetic medium 12 may be formed as a magnetic data storage tape with a barium ferrite or other magnetic coating configured for perpendicular recording. Alternatively, magnetic medium 12 may be formed as a disc or pattern media, an analog (e.g., video or audio) medium, or a magneto-resistive medium, as described above.

Magnets 60 have magnetization H, in order to provide flux to tapered poles 64 along magnetic medium 12. In general, magnetization H has both longitudinal components $H_x$ and transverse components $H_y$. Depending on configuration, magnetic flux H may have a generally longitudinal or parallel orientation with respect to the plane of magnetic medium 12, where $H_x \neq 0$ and $H_y \approx 0$, or with $H_y$ substantially less than or approximately negligible with respect to $H_x$. Alternatively, magnetic flux H may have a generally transverse or perpendicular orientation with respect the plane of magnetic medium 12, where $H_y \neq 0$ and $H_x \approx 0$, or with $H_x$ substantially less than or approximately negligible with respect to $H_y$. In preferred embodiments, when magnetization is adjusted, the location, shape, size, and other geometry of the components may be adjusted to account for the change in magnetization. However, in the context of the invention, there is no particular requirement for any such limitation.

Magnetic core 62 is coupled to magnet 60, in order to provide flux to tapered pole portion 64. Tapered pole portion 64 may be formed as a single or unitary structure with magnetic core 62, or tapered pole 64 may be provided as a separate structure, magnetically coupled to core 62.

Tapered poles 64 have decreasing transverse width W along magnetic medium 12, in order to increase flux density at pole faces 66. In one particular application, tapered poles 64 are oriented in a trailing configuration with respect to magnetic cores 62, and longitudinal magnetization $H_x$ is oriented along media travel direction T at pole faces 66, adjacent magnetic medium 12. The sign convention is arbitrary, however, and both longitudinal and transverse magnetizations $H_x$ and $H_y$ may be taken in either direction, without loss of generality.

Pole faces 66 are formed transversely to the plane of magnetic medium 12, increasing longitudinal bias and uniformity along the magnetic coating. Thus, tapered cores 62 and tapered pole sections 64 provide increased or maximum longitudinal DC bias on a randomly oriented magnetic medium. Conversely, the perpendicular bias may be substantially reduced, as compared to the longitudinal component, in order to improve symmetry in the servo tracks and other data patterns written to magnetic medium 12.

Where magnetization H has a substantial parallel aspect, for example, magnets 60 may provide complimentary longitudinal components $H_x$. Where magnetization H has a substantial perpendicular aspect, magnets 60 may provide substantially opposed transverse magnetizations $H_y$ and $-H_y$, in order to reduce or minimize perpendicular bias. Magnets 60 may also be provided different magnetizations H, in order to increase longitudinal magnetization $H_x$, or to reduce or minimize perpendicular components $H_y$.

Coils 61 and other electromagnetic components can also be provided, either alone or in combination with ferrites and other permanent magnetic elements 60. Similarly, ferrites and other permanent magnetic elements 60 can be used alone or in combination with other components. As a result, larger magnetic fields can be produced at magnetic medium 12, as compared to other techniques, and the field strength can be more precisely controlled. This allows head assembly 58 to generate higher longitudinal field strength with smaller transverse or perpendicular bias, as compared to the longitudinal component.

Air gap G and the aspect ratio of tapered pole section 64 can also be varied, for example by positioning head sections 42 and 44, or adjusting angle α along on the trailing surface adjacent magnetic medium 12. This allows magnetic head assembly 58 to further compensate for non-zero (net) transverse field components $H_y$, and further reduce perpendicular bias.

Magnetic coupling material 84 may also be provided, for example within non-magnetic gap G3 between magnet 60 and core 62. Coupling material 84 may be formed of a soft or hard magnetic material, or a relatively high permeability material such as mu-metal.

Coupling material 84 can be provided in the form of a screw or a screw-driven device such as a micrometer, which can be manually positioned or controlled by actuator 78 based on control or feedback signal S. Coupling material 84 can be also be positioned by sliding or rotating, either along (parallel to) or across (perpendicular to) the gap field, in order to adjust the corresponding field strength at magnetic medium 12. Alternatively, the coupling between magnet 60 and magnetic core 62 can also be controlled by positioning magnet 60 or tapered core 62 to adjust the width of gap G3.

In each of the various embodiments, examples and applications described herein, the orientation of head assembly 58 with respect to magnetic medium 12 is representative, and make take other forms. Thus, surface 12A or second surface 12B of magnetic medium 12 may face forward in the figures, and guides 56 may be positioned on either or both sides. In addition, media travel direction T may be reversed, and the horizontal and vertical orientations of head assembly 58 and individual head sections 42 and 44 may be inverted with respect to magnetic medium 12, without loss of generality.

Other combinations of the various components of head assembly 58 are also contemplated, and fall within the scope of the disclosure. Thus, any of the different head sections 42 and 44, guides 56, magnets 60 and 76, coils 61, magnetic core and pole elements 62, 64, 66, 68, 74, 80 and 82, non-magnetic spacers 70, gaps 72, and magnetic coupling materials 84 described here may be provided in any suitable combination or orientation, with or without one or more actuators 78 for positioning these components with respect to first and second surfaces 12A and 12B of magnetic medium 12.

In the foregoing description, various embodiments of the invention have thus been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A system comprising:
   a first tapered core positioned near a first surface of a magnetic medium;
   a first magnet coupled to the first tapered core, said first magnet configured to provide longitudinal flux along the first surface of the magnetic medium; and
   a second tapered core positioned near a second surface of the magnetic medium, the second tapered core positioned opposite the first tapered core along a travel direction of the magnetic medium;
   wherein each of the first and second tapered cores has a transverse width defined with respect to the magnetic medium, the transverse width decreasing from a first end of the tapered core to a second end of the tapered core and the second end forming a pole face adjacent the magnetic medium.

2. The system of claim 1, wherein each of the tapered cores has a longitudinal flux density, the longitudinal flux density increasing from the first end of the tapered core to the pole face.

3. The system of claim 2, wherein the transverse widths of the first and second tapered cores decrease along a travel direction of the magnetic medium.

4. The system of claim 2, wherein the pole faces of the first and second tapered cores extend transversely from the first and second surfaces of the magnetic medium.

5. The system of claim 4, wherein the pole faces of the first and second tapered cores are substantially aligned along the travel direction.

6. The system of claim 1, wherein the transverse width of at least one of the first and second tapered cores decreases substantially linearly along the magnetic medium.

7. The system of claim 6, wherein the at least one tapered core has a generally triangular configuration extending along the magnetic medium.

8. The system of claim 1, wherein at least one of the first and second tapered cores has a substantially curved configuration extending along the magnetic medium.

9. The system of claim 1, comprising a first magnetic core having a transverse leg extending from the first magnet to a longitudinal leg extending along the first tapered core.

10. The system of claim 1, wherein the first magnet provides longitudinal flux to the second tapered core via a magnetic coupling across the magnetic medium.

11. The system of claim 1, comprising a magnet having transverse magnetization with respect to the magnetic medium and spaced from the second tapered core along the second surface of the magnetic medium.

12. The system of claim 1, comprising a second magnet coupled to the second tapered core and a second magnetic core having a transverse leg extending from the second magnet to a longitudinal leg extending along the second tapered core.

13. The system of claim 1, further comprising a tape-based magnetic medium processed thereby.

14. The system and tape-based magnetic medium of claim 13, the magnetic medium comprising a magnetic coating configured for perpendicular recording.

15. The system and tape-based magnetic medium of claim 14, wherein the magnetic coating comprises barium ferrite.

16. A system for processing a magnetic medium having first and second major surfaces, the system comprising:
    a first magnetic head comprising a tapered core adjacent the first major surface;
    a second magnetic head comprising a tapered core adjacent the second major surface, the second magnetic head positioned substantially opposite the first magnetic head across the magnetic medium; and
    a magnet extending across an edge of the magnetic medium from the first head to the second head;
    wherein each of the tapered cores has a transverse width decreasing from a first end of the tapered core to a second end of the tapered core, the second ends of the tapered cores forming pole faces adjacent the first and second major surfaces of the magnetic medium.

17. The system of claim 16, comprising edge cores coupled to opposing surfaces of the magnet, wherein the edge cores extend along the opposing surfaces of the magnet and across the edge of the magnetic medium, from the first magnetic head to the second magnetic head.

18. The system of claim 16, comprising a slot dividing the magnet into the first and second heads, wherein the magnetic medium is positioned in the slot.

19. The system of claim 16, wherein the first magnetic head comprises opposing tapered cores extending along the first major surface of the magnetic medium to form a first magnetic gap, the first magnetic gap extending transversely with respect to a travel direction of the magnetic medium.

20. The system of claim 19, comprising a nonmagnetic material disposed between the opposing tapered cores.

21. The system of claim 19, wherein the second magnetic head comprises opposing tapered cores extending along the second major surface of the magnetic medium to form a second magnetic gap, the second magnetic gap extending transversely with respect to the travel direction, substantially opposite the first magnetic gap.

22. The system of claim 16, comprising trailing cores adjacent the first and major surfaces of the magnetic medium, wherein the trailing cores are spaced from the tapered cores along the travel direction.

23. The system of claim 22, wherein the trailing cores define a spacing across the magnetic medium that is larger than a corresponding spacing of the tapered cores across the magnetic medium.

24. An apparatus comprising:
    a magnetic medium having a magnetic coating;
    a first magnetic element comprising a first tapered core positioned near and configured to generate longitudinal flux along a first major surface of the magnetic medium, the first magnetic element having a first transverse magnetization with respect to the magnetic medium;
    a first magnet coupled to the first tapered core, said first magnet configured to provide the longitudinal flux along the first major surface of the magnetic medium; and
    a second magnetic element comprising a second tapered core positioned near and configured to generate flux along a second major surface of the magnetic medium, the second tapered core positioned opposite the first tapered core along a travel direction of the magnetic medium and the second magnetic element having a second transverse magnetization with respect to the magnetic medium;

wherein the first and second magnetic elements are configured to generate substantially complementary longitudinal flux and substantially opposed transverse flux along the magnetic coating of the magnetic medium; and wherein each of the first and second tapered cores has a transverse width defined with respect to the magnetic medium, the transverse width decreasing from a first end of the tapered core to a second end of the tapered core and the second end forming a pole face adjacent the magnetic medium.

25. The apparatus of claim 24, comprising the first tapered pole coupled to the first magnetic element and extending with decreasing width along the magnetic medium to a first instance of the pole face adjacent the first major surface.

26. The apparatus of claim 25, comprising the second tapered pole coupled to the second magnetic element and extending with decreasing width along the magnetic medium to a second instance of the pole face adjacent the second major surface.

27. The apparatus of claim 26, comprising a first trailing core coupled to the first magnetic element, the first trailing core extending to a first trailing pole face spaced from the first major surface of the magnetic medium.

28. The apparatus of claim 27, comprising a second trailing core coupled to the second magnetic element, the second trailing core extending to a second trailing pole face spaced from the second major surface of the magnetic medium.

29. The apparatus of claim 24, wherein said second magnetic element is oriented substantially opposite the first magnetic element.

* * * * *